United States Patent
Ashworth

(10) Patent No.: US 11,418,251 B2
(45) Date of Patent: Aug. 16, 2022

(54) SIGNAL BOOSTER FOR SPECTRALLY ADJACENT BANDS

(71) Applicant: Wilson Electronics, LLC, St. George, UT (US)

(72) Inventor: Christopher Ken Ashworth, Toquerville, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 17/325,091

(22) Filed: May 19, 2021

(65) Prior Publication Data

US 2021/0367659 A1    Nov. 25, 2021

Related U.S. Application Data

(60) Provisional application No. 63/029,266, filed on May 22, 2020.

(51) Int. Cl.
*H04B 7/155* (2006.01)
*H04W 88/04* (2009.01)

(52) U.S. Cl.
CPC ..... *H04B 7/15528* (2013.01); *H04B 7/15507* (2013.01); *H04W 88/04* (2013.01)

(58) Field of Classification Search
CPC ............ H04B 7/15528; H04B 7/15507; H04B 7/15535; H04B 7/15542; H04B 1/0053; H04W 88/04
See application file for complete search history.

(56) References Cited

U.S. PATENT DOCUMENTS

| 4,776,032 A | 10/1988 | Odate et al. |
| 5,303,395 A | 4/1994 | Dayani |
| 5,737,687 A | 4/1998 | Martin et al. |

(Continued)

FOREIGN PATENT DOCUMENTS

| EP | 1525678 B1 | 7/2008 |
| EP | 3577796 A1 | 12/2019 |
| WO | WO 2018/144945 A1 | 8/2018 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

(Continued)

*Primary Examiner* — Hashim S Bhatti
(74) *Attorney, Agent, or Firm* — Thorpe North & Western LLP

(57) ABSTRACT

Technology for a repeater is disclosed. The repeater can include a first port, a second port, and a third port. The repeater can include a first amplification and filtering path communicatively coupled between the first port and the second port for a first frequency range. The repeater can include a second amplification and filtering path communicatively coupled between the first port and the third port for a second frequency range. The first frequency range can be spectrally adjacent to the second frequency range in a same signal direction, and a combination of the first frequency range and the second frequency range can have a fractional bandwidth that is greater than a defined fractional bandwidth threshold ratio for a selected filter type.

48 Claims, 9 Drawing Sheets

(56) References Cited

U.S. PATENT DOCUMENTS

| | | |
|---|---|---|
| 5,777,530 A | 7/1998 | Nakatuka |
| 5,835,848 A | 11/1998 | Bi et al. |
| 6,005,884 A | 12/1999 | Cook et al. |
| 6,711,388 B1 * | 3/2004 | Neitiniemi ............ H03G 3/3042 455/127.1 |
| 6,889,033 B2 | 5/2005 | Bongfeldt |
| 6,990,313 B1 | 1/2006 | Yarkosky |
| 7,035,587 B1 | 4/2006 | Yarkosky |
| 7,221,967 B2 | 5/2007 | Van Buren et al. |
| 7,974,573 B2 | 7/2011 | Dean |
| 2002/0044594 A1 | 4/2002 | Bongfeldt |
| 2003/0123401 A1 | 7/2003 | Dean |
| 2004/0137854 A1 | 7/2004 | Ge |
| 2004/0146013 A1 | 7/2004 | Song et al. |
| 2004/0166802 A1 | 8/2004 | McKay, Sr. et al. |
| 2004/0219876 A1 | 11/2004 | Baker et al. |
| 2004/0235417 A1 | 11/2004 | Dean |
| 2005/0118949 A1 * | 6/2005 | Allen ................ H04B 7/15578 455/13.4 |
| 2006/0084379 A1 | 4/2006 | O'Neill. |
| 2007/0071128 A1 | 3/2007 | Meir et al. |
| 2007/0188235 A1 | 8/2007 | Dean |
| 2008/0081555 A1 | 4/2008 | Kong et al. |
| 2008/0096483 A1 | 4/2008 | Van Buren et al. |
| 2008/0278237 A1 | 11/2008 | Blin |
| 2011/0151775 A1 * | 6/2011 | Kang ................ H04B 7/15535 455/10 |
| 2016/0135059 A1 | 5/2016 | Zhan |

OTHER PUBLICATIONS

ADL5513; "1 MHz to 4 GHz, 80 dB Logarithmic Detector/ Controller"; Data Sheet; (2008); 12 pages; Analog Devices, Inc.
HMC713LP3E; "54 dB, Logarithmic Detector / Controller, 50-8000 MHz"; Data Sheet; (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS FLASH Microcontrollers"; (2001); Data Sheet; 218 pages.

\* cited by examiner

SIGNAL BOOSTER FOR SPECTRALLY ADJACENT BANDS

PRIORITY CLAIM(S) AND RELATED APPLICATION(S)

Priority is claimed to U.S. Provisional Patent Application Ser. No. 63/029,266, filed May 22, 2020, which is hereby incorporated by reference in its entirety.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
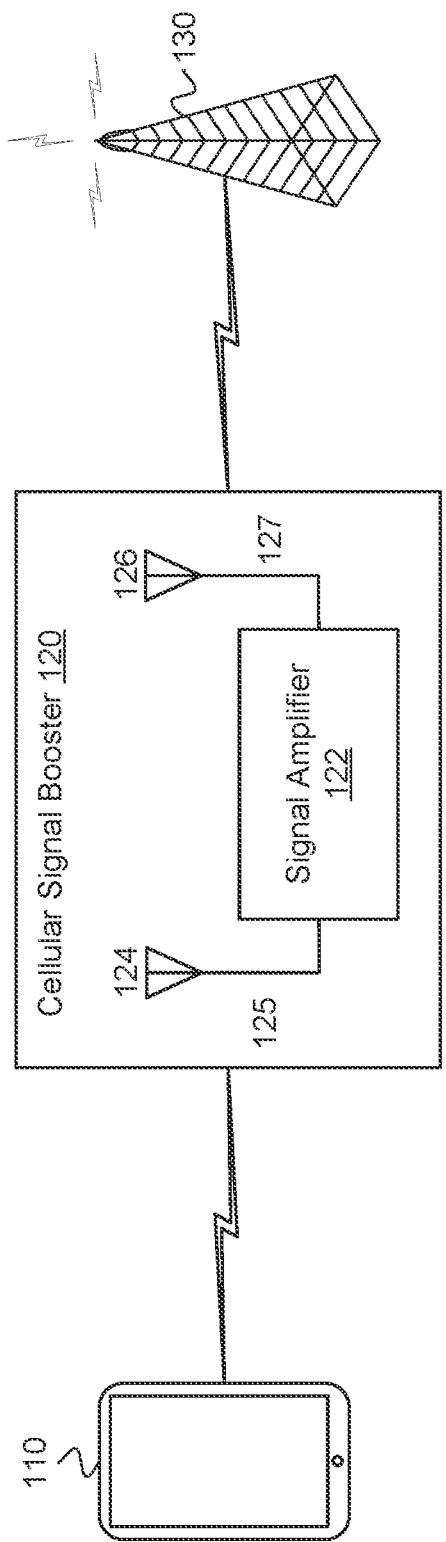
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

As used herein, the term "approximately" is used to provide flexibility and imprecision associated with a given term, metric or value. The degree of flexibility for a particular variable can be readily determined by one skilled in the art. However, unless otherwise enunciated, the term "approximately" generally connotes flexibility of less than 2%, and most often less than 1%, and in some cases less than 0.01%.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna, server antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, 13, 14, 15, or 16, 3GPP 5G Release 15 or 16, or Institute of Electronics and Electrical Engineers (IEEE) 802.16. In one configuration, the repeater 220 can boost signals for 3GPP LTE Release 16.0.0 (January 2019) or other desired releases. The signal booster 120 can boost signals from the 3GPP Technical Specification (TS) 36.101 (Release 15 Sep. 2017) bands or LTE frequency bands. For example, the signal booster 120 can boost signals from the LTE frequency bands: 2, 4, 5, 12, 13, 17, 25, and 26. In addition, the signal booster 120 can boost selected frequency bands based on the country or region in which the signal booster is used, including any of bands 1-85 or other bands, as disclosed in 3GPP TS 36.104 V16.0.0 (January 2019).

In another configuration, the repeater 220 can boost signals from the 3GPP Technical Specification (TS) 38.104 (Release 15 Jan. 2019) bands or 5G frequency bands. In addition, the repeater 220 can boost selected frequency bands based on the country or region in which the repeater is used, including any of bands n1-n86, n257-n261, or other bands, as disclosed in 3GPP TS 38.104 V15.4.0 (January 2019).

The number of 3GPP LTE or 5G frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

Figure 2:
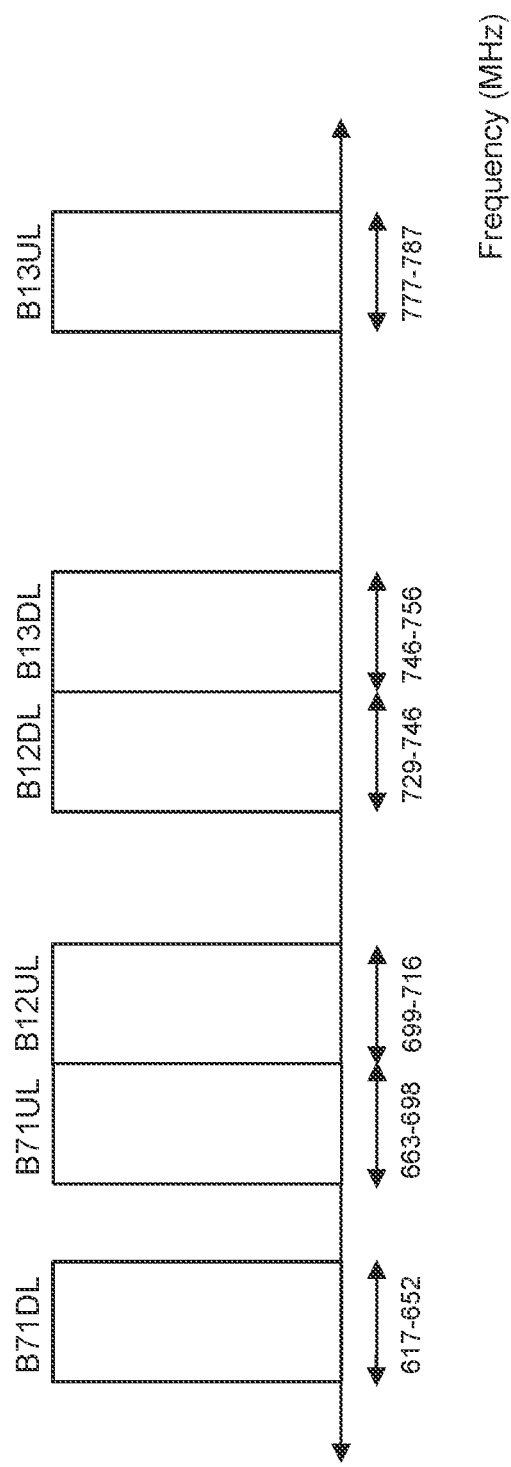
FIG. 2 illustrates frequency ranges for a plurality of uplink and downlink bands in accordance with an example.

FIG. 2 illustrates exemplary frequency ranges for a plurality of uplink and downlink bands. The frequency ranges can be measured in megahertz (MHz). The uplink bands can include band 12 (B12), band 13 (B13) and band 71 (B71). The downlink bands can include band 12 (B12), band 13 (B13), and band 71 (B71). As shown, B71 can correspond to a frequency range of 617 MHz to 652 MHz in a downlink, B71 can correspond to a frequency range of 663 MHz to 698 MHz in an uplink, B12 can correspond to a frequency range of 699 MHz to 716 MHz in an uplink, B12 can correspond to a frequency range of 729 MHz to 746 MHz in a downlink, and B13 can correspond to a frequency range of 746 MHz to 756 MHz in the downlink. B71 and B12 can be spectrally adjacent bands in the uplink, and B12 and B13 can be spectrally adjacent bands in the downlink. In addition, B13 can correspond to a frequency range of 777 MHz to 787 MHz in the uplink.

As used herein, two bands can be "spectrally adjacent" when the two bands are abutting (i.e., 0 MHz between the two bands), or two bands can be spectrally adjacent when there is a relatively small amount of spectrum gap or frequency separation between the two bands, such as 1 MHz or 2 MHz. In one example, "spectrally adjacent" can be defined functionally based on a filter roll-off capability. When bands are so close together that a bandpass filter (BPF) would be unable to roll off (or attenuate) the other band more than, for example, 10 dB, the bands can be considered spectrally adjacent. By this definition, 1-5 MHz between bands would reasonably still allow two bands to be considered spectrally adjacent. In some cases, the separation between spectrally adjacent bands can be up to 9 MHz or more depending on a frequency and a Q factor of the bandpass filter. As a result, "spectrally adjacent" separation can be different depending on which bandpass filter technology is being used. For example, a lower Q technology might consider two bands spectrally adjacent where a higher Q technology would be able to filter the bands separately.

Signal boosters (or repeaters) are continually being designed to operate on an increased number of frequency bands (or frequency ranges). As the number of frequency bands increase, spectrally adjacent frequency bands can especially be challenging when designing signal boosters. A signal booster often uses multiplexers (e.g., duplexers, triplexers, quadplexers) to separate the various uplink and downlink amplification and filtering signal paths in the signal booster. One quadplexer design that has been especially difficult for manufacturers to develop is a surface acoustic wave (SAW) B12-13-71 quadplexer, which comprises a B71DL-B12/71UL duplexer abutted with a B12UL-B12/13DL duplexer. One reason this has been difficult to develop is that B12-71UL are spectrally adjacent bands and span from 663-716 MHz, which has a fractional bandwidth of 7.7%. The fractional bandwidth is a passband bandwidth relative to or divided by a center frequency. In the case of B12-71UL, this would equate to 53 MHz/689.5 MHz, which is equal to the fractional bandwidth of 7.7%. Typical SAW filter manufacturers are unable to develop a B12/71UL filter with that wide of a factional bandwidth, as a fractional bandwidth of 3-5% is typically more feasible.

Further, even if such a wide fractional bandwidth was achieved, in this case, there is a narrow guard band on the lower side, as the downlink path starts at 652 MHz. Thus, in addition to the fractional bandwidth, another measure that is taken into account during filter design is the relative gap. The relative gap is a bandwidth of the guard band or gap relative to or divided by a center frequency of the guard band or gap. In the case of B12-71UL, this would equate to 11 MHz/657.5 MHz, which is equal to a relative gap of 1.67%. While typical SAW filter manufacturers might be able to develop a filter with such a relative gap, albeit with some difficulty, such a narrow relative gap combined with a wide fractional bandwidth (such as a fractional bandwidth of 7.7% for a B12/71UL filter) makes designing such a quadplexer extremely challenging. As a result, developing a SAW B12-13-71 quadplexer (which includes a B12/71UL filter) for a signal booster has been hindered by these factors.

In one example, both the fractional bandwidth and the relative gap are important measures when designing SAW filters for signal boosters. Generally, the fractional bandwidth should be less than a certain threshold (e.g., about 5%), whereas the relative gap should be above a certain threshold (e.g., about 1%).

In one example, a B12-13-71 quadplexer made from ceramic filters may be possible, as the fractional bandwidth and relative gap constraints are different for ceramic filters as compared to SAW filters. However, the increased size of ceramic filters is a problem for use in signal boosters. Therefore, using ceramic filters in the signal booster design is not a feasible option.

In the present technology, to overcome the difficulties of developing a SAW B12-13-71 quadplexer for a signal booster, a B12-13-71 quadplexer-less signal booster design is described herein. In this design, the signal booster does not use a B12-13-71 quadplexer. Rather, the signal booster can incorporate two separate donor ports and a combined server port. A first donor port can be associated with a first uplink signal path for B12UL and a second donor port can be associated with a second uplink signal path for B71UL. In this case, B12UL and B71UL can be amplified independently on separate uplink signal paths. Two separate donor ports, communicatively coupled to two separate donor antennas (or outside antennas), can be used because if B12UL and B71UL were to be recombined from separate bandpass filters (i.e., using a single combined donor port), B12UL and B71UL would overlap. Thus, the separate donor ports and corresponding separate donor antennas can provide sufficient spatial isolation between B12UL and B71UL.

In one example, the signal booster can include a single server port, which can be communicatively coupled to a server antenna (or inside antenna). The single server port, as opposed to having two separate server ports, can reduce an amount of cabling through a building that houses the signal booster, as well as reduce a number of server antennas (or inside antennas) from two to one.

In one example, the first uplink signal path for B12UL and the second uplink signal path for B71UL can be coupled to a combiner device, such as a signal splitter, a directional coupler, a circulator, etc. In one example, the signal splitter can include a directional coupler family. In another example, the first uplink signal path for B12UL and the second uplink signal path for B71UL can be coupled to a filter if discrete matching is applied. The signal splitter and the directional coupler are frequency agnostic, so are suitable for splitting the two separate uplink paths.

In one example, a B12-71UL signal can be received at the server port. The server port can be coupled to the signal splitter. The signal splitter can separate B12UL from B71UL. For example, the signal splitter can separate a total power into two paths—one path is the first uplink signal path for B12UL and the other path is the second uplink signal path for B71UL. In other words, the signal splitter can take that entire B12-71UL signal, and put half of the B12-71UL signal in one signal path and the other half of the B12-71UL signal on the other signal path. At this point, bandpass filter(s) on each signal path can filter the B12-71UL signal appropriately. For example, the first uplink signal path for B12UL can include a B12UL BPF, and the second uplink signal path for B71UL can include a B71UL BPF. The B12UL BPF can slightly overlap in B71UL, and similarly, the B71UL BPF can slightly overlap in B12UL. In other words, the B71UL BPF can slightly roll off into the B12UL BPF, such that the first uplink signal path for B12UL and the second uplink signal path for B71UL cannot be recombined. If a signal splitter were to be used to recombine the first uplink signal path for B12UL and the second uplink signal path for B71UL, the passbands of each would slightly overlap resulting in destructive interference. Therefore, the signal booster can include separate donor antennas, and the resulting signal which has been filtered and amplified can be transmitted from one of the two donor antennas. In this design, the common server port and the separate donor ports can enable B12 and B71 to coexist in an uplink, in view of the challenges of developing a combined B12-71UL BPF due to the wide fractional bandwidth and the reduced relative gap.

Figure 3:
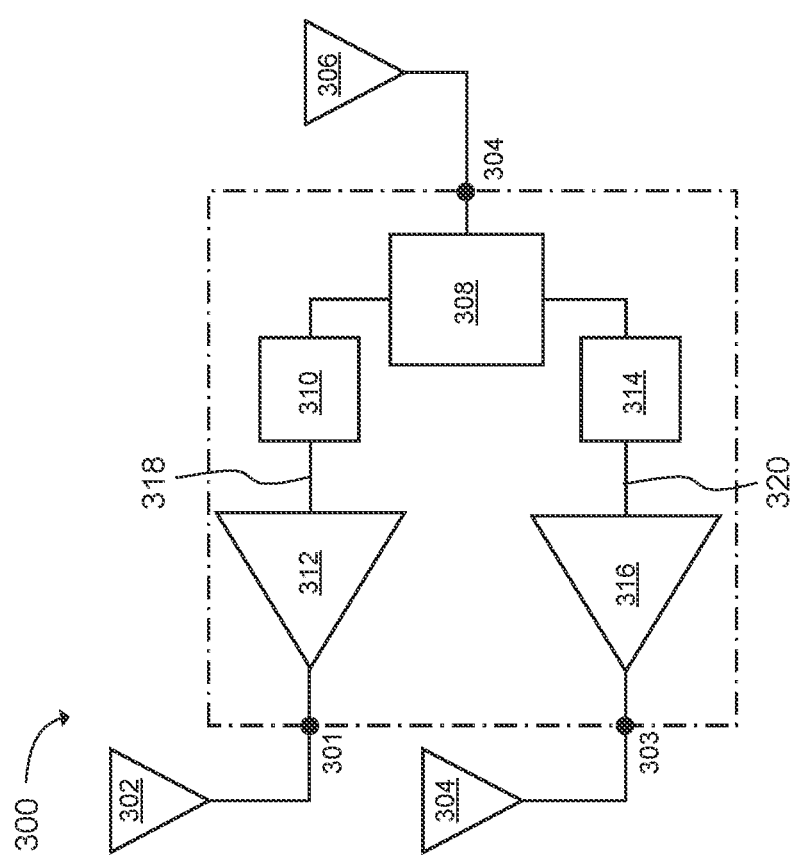
FIG. 3 illustrates a repeater having separate donor ports and a combined server port in accordance with an example.

FIG. 3 illustrates an example of a repeater 300 (or signal booster) having separate donor ports and a combined server port. For example, the repeater 300 can include a first donor port 301, a second donor port 303 and a server port 304. The first donor port 301 can be communicatively coupled to a first donor antenna 302, the second donor port 304 can be communicatively coupled to a second donor antenna 304, and the server port 304 can be communicatively coupled to a server antenna 306. The donor antennas 302, 304 and the server antenna 306 can also be referred to outside antennas and an inside antenna, respectively.

In one example, the repeater 300 can include a signal splitter 308 (or a directional coupler) communicatively coupled to the server antenna 306. Further, the signal splitter 308 can be communicatively coupled to a first uplink signal path 318 and a second uplink signal path 320. In a specific example, the first uplink signal path 318 can be associated with B12UL and the second uplink signal path 320 can be associated with B71UL. The first uplink signal path 318 can also be communicatively coupled to the first donor antenna 302, and the second uplink signal path 320 can also be communicatively coupled to the second donor antenna 304.

In one example, the first uplink signal path 318 can include a BPF 310 (e.g., a B12UL BPF) and an amplifier chain 312. The amplifier chain 312 can include a low noise amplifier (LNA) and/or a power amplifier (PA). Further, the first uplink signal path 318 can include a variable attenuator to apply a fixed or variable gain. Similarly, the second uplink signal path 320 can include a BPF 314 (e.g., a B71UL BPF) and an amplifier chain 316. The amplifier chain 316 can include an LNA and/or PA. Further, the second uplink signal path 320 can include a variable attenuator to apply a fixed or variable gain.

As shown in FIG. 2, the uplink signal paths for B12UL and B71UL can be separated, and can be communicatively coupled to separate donor ports. As a result, B12UL and B71UL can coexist in the repeater 300, even though B12UL and B71UL combined have a fractional bandwidth that exceeds a defined threshold and a relative gap that is less than a defined threshold. Since a combined B12-71UL filter presents numerous challenges, as described above, the repeater 300 can incorporate the separate uplink signal paths for B12UL and B71UL, as well as the separate donor ports for B12UL and B71UL.

Figure 4:
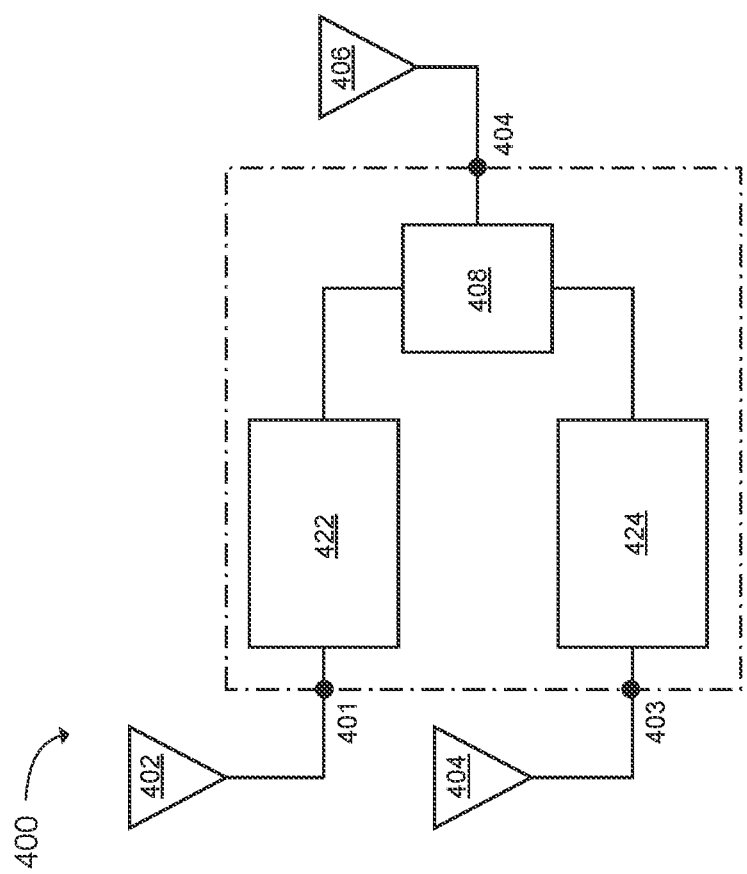
FIG. 4 illustrates a repeater having separate donor ports and a combined server port in accordance with an example.

FIG. 4 illustrates an example of a repeater 400 (or signal booster) having separate donor ports and a combined server port. For example, the repeater 400 can include a first donor port 401, a second donor port 403 and a server port 404. The first donor port 401 can be communicatively coupled to a first donor antenna 402, the second donor port 404 can be communicatively coupled to a second donor antenna 404, and the server port 404 can be communicatively coupled to a server antenna 406. The donor antennas 402, 404 and the server antenna 406 can also be referred to outside antennas and an inside antenna, respectively.

In one example, the repeater 400 can include a signal splitter 408 (or a directional coupler) communicatively coupled to the server antenna 406. Further, the signal splitter 408 can be communicatively coupled to a first sub-repeater 422 and a second sub-repeater 424. In a specific example, the first sub-repeater 422 can be associated with B12 (as well as other bands, such as B5, B13, B25, and B66) and the second sub-repeater 424 can be associated with B71. In other words, the first sub-repeater 422 and the second sub-repeater 424 can be discrete sub-repeaters, or can be integrated into a single unit. The first sub-repeater 422 and the second sub-repeater 424 can include one or more amplification and filtering signal paths in an uplink and downlink.

Figure 5:
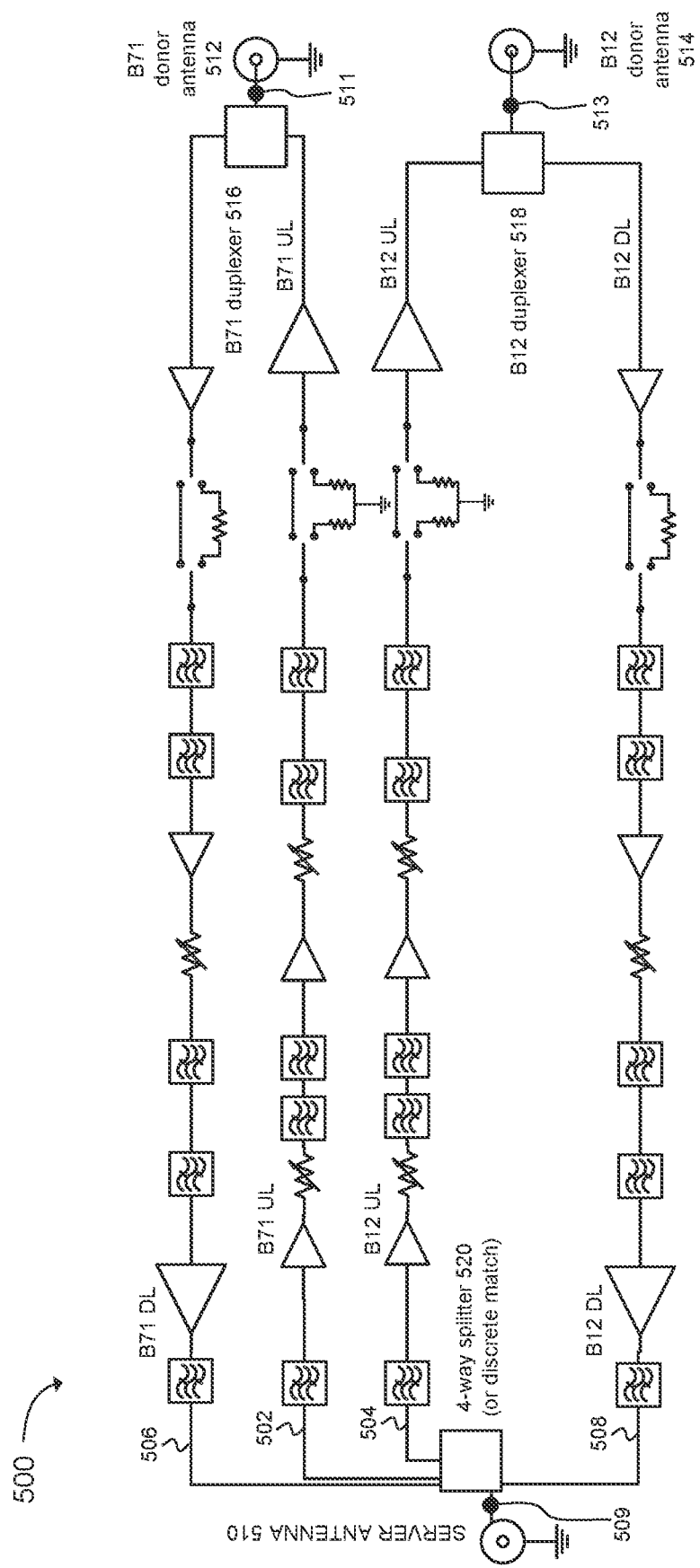
FIG. 5 illustrates a repeater having separate donor antennas and a combined server antenna in accordance with an example.

FIG. 5 illustrates an example of a repeater 500 having separate donor antenna ports 511, 513 and a combined server antenna port 509. The repeater 500 can include a server antenna 510 communicatively coupled to the server port 509, a first donor antenna 512 (e.g., a B71 donor antenna) communicatively coupled to a first donor port 511, and a second donor antenna 514 (e.g., a B12 donor antenna) communicatively coupled to a second donor port 513.

In one example, the repeater 500 can include a first amplification and filtering path 502 for a first first-direction signal (e.g., a first UL signal) communicatively coupled between the first donor port 511 and the server port 509 for a first first-direction band (e.g., B71UL). The repeater 500 can further include a second amplification and filtering path 504 for a second first-direction signal (e.g., a second UL signal) communicatively coupled between the second donor port 513 and the server port 509 for a second first-direction band (e.g., B12UL). In this example, the first first-direction band (e.g., B71UL) can be spectrally adjacent to the second first-direction band (e.g., B12UL), and a combination of the first first-direction band (e.g., B71UL) and the second first-direction band (e.g., B12UL) can have a fractional bandwidth that is greater than a defined fractional bandwidth threshold ratio for a selected filter type. In one example, the selected filter type can be a surface acoustic wave (SAW) filter. In another example, the first first-direction band and the second first-direction band can have a spectral gap that is less than a threshold, where the spectral gap can be a frequency gap between the first first-direction band and the second first-direction band. As a non-limiting example, a spectral gap of 1 MHz or 2 MHz may be less than the threshold, thereby making the first first-direction band spectrally adjacent to the second first-direction band.

In one example, the defined fractional bandwidth threshold ratio for the selected filter type (e.g., SAW filter) can be approximately 5%. Further, the combination of the first first-direction band (e.g., B71UL) and the second first-direction band (e.g., B12UL) can have a relative gap that is less than a defined relative gap threshold ratio for the selected filter type. In a specific example, the defined relative gap threshold ratio for the selected filter type can be 1% or 0.75%.

Figure 8:
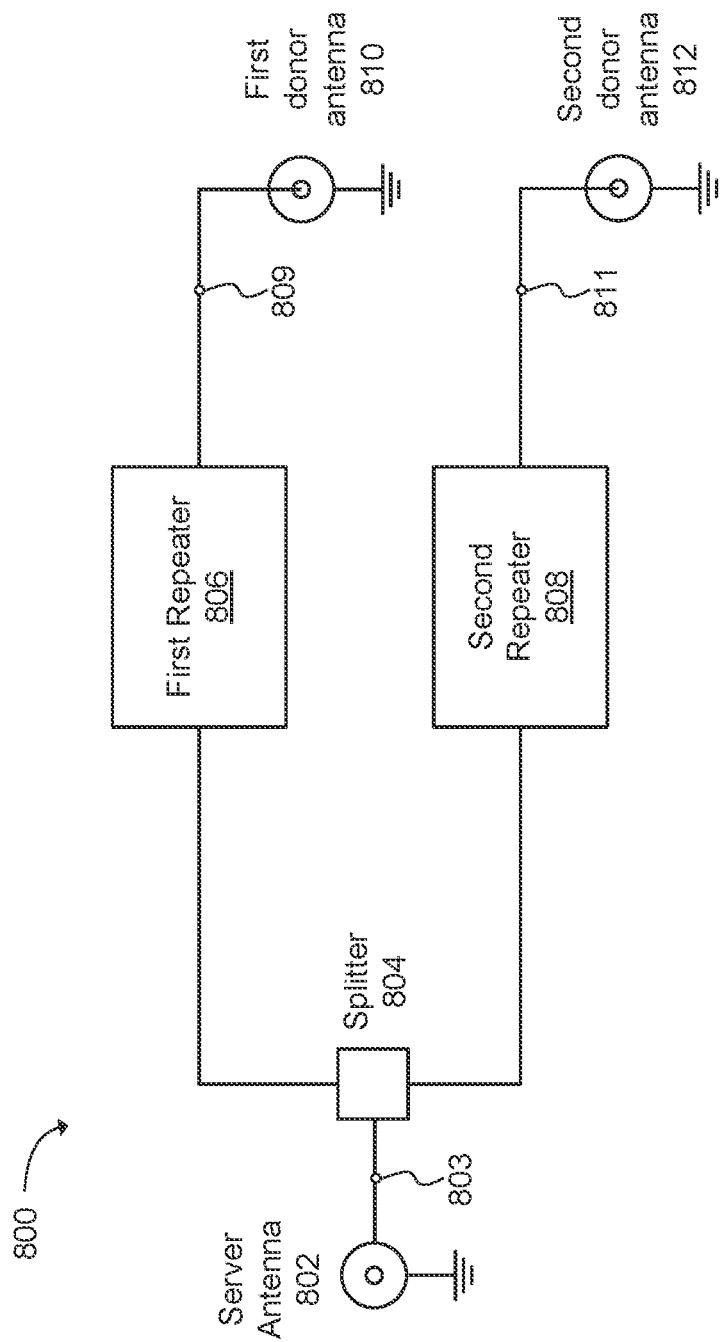
FIG. 8 illustrates a repeater system including multiple repeaters and separate donor antennas for each of the repeaters in accordance with an example.

As shown in FIG. 5, the uplink signal paths for B12UL and B71UL can be separated, and can be communicatively coupled to separate donor ports. As a result, B12UL and B71UL can coexist in the repeater 500, even though B12UL and B71UL combined have a fractional bandwidth that exceeds a defined threshold and a relative gap that is less than a defined threshold. In one example, the B12 and B71 UL and DL paths can be located in a single repeater coupled to a single server antenna and multiple donor antennas, as illustrated in FIG. 3. Alternatively, two separate repeaters can be used, as illustrated in FIG. 8. For example, a first repeater may be a multiband repeater, and a second repeater may be a single band repeater, such as a B71 repeater or a B12 repeater. A server port of each of the two repeaters can be coupled to a single server antenna via a splitter/combiner, as discussed. The donor port of each repeater can be coupled to a separate donor antenna, as shown in FIG. 8.

In this example, the first amplification and filtering path 502 and the second amplification and filtering path 504 can be uplink paths, and the third amplification and filtering path 506 and the fourth amplification and filtering path 508 can be downlink paths. Further, the first first-direction band can correspond to a B71 uplink frequency range between 663 MHz and 698 MHz, and the second first-direction band can correspond to a B12 uplink frequency range between 699 megahertz (MHz) and 716 MHz.

In one example, the repeater 500 can include a third amplification and filtering path 506 for a first second-direction signal (e.g., a first DL signal) communicatively coupled between the first donor port 511 and the server port 509 for a first second-direction band (e.g., B71DL). The repeater 500 can further include a fourth amplification and filtering path 508 for a second second-direction signal (e.g., a second DL signal) communicatively coupled between the second donor port 513 and the server port 509 for a second second-direction band (e.g., B12DL).

In one example, the repeater 500 can include a first multiplexer 516 (e.g., a B71 duplexer) communicatively coupled to the first donor port 511, the first amplification and filtering path 502 and the third amplification and filtering path 506. In addition, the repeater 500 can include a second multiplexer 518 (e.g., a B12 duplexer) communicatively coupled to the second donor port 513, the second amplification and filtering path 504 and the fourth amplification and filtering path 508.

In one example, the first donor port 511 can send the first first-direction signal (e.g., the first UL signal) amplified by the repeater 500 to the first donor antenna 512 coupled to the first donor port 511. In addition, the first donor port 511 can receive the first second-direction signal (e.g., the first DL signal) at the first donor port 511 from the first donor antenna 512.

In one example, the second donor port 513 can send the second first-direction signal (e.g., the second UL signal) amplified by the repeater 500 to the second donor antenna 514 coupled to the second donor port 513. In addition, the second donor port 513 can receive the second second-direction signal (e.g., the second DL signal) at the second donor port 513 from the second donor antenna 514.

In one example, the repeater 500 can include a signal splitter 520 (e.g., a 4-way splitter) communicatively coupled between the first donor port 511, the second donor port 513 and the server port 509, where the signal splitter 520 can be coupled to the first amplification and filtering path 502 and the second amplification and filtering path 504. In this example, the signal splitter 520 can also be coupled to the third amplification and filtering path 506 and the fourth amplification and filtering path 508.

In one example, the server port 509 can send the first second-direction signal (e.g., the first DL signal) amplified by the repeater 500 to the server antenna 510 coupled to the server port 509. Further, the server port 509 can receive the first first-direction signal (e.g., the first UL signal) at the server port 509 from the server antenna 510. Further, the server port 509 can send the second second-direction signal (e.g., the second DL signal) amplified by the repeater 500 to the server antenna 510 coupled to the server port 509. Further, the server port 509 can receive the second first-direction signal (e.g., the second UL signal) at the server port 509 from the server antenna 510.

In one example, the repeater 500 can include a discrete match filter device instead of the signal splitter 520. The discrete match filter device can be communicatively coupled between the first donor port 511, the second donor port 513 and the server port 509, where the discrete match filter device can be coupled to one or more of: the first amplification and filtering path 502, the second amplification and filtering path 504, the third amplification and filtering path 506 and the fourth amplification and filtering path 508. The discrete match filter device can include one or more bandpass filters corresponding to one or more of the first first-direction band (e.g., B71UL), the second first-direction band (e.g., B12UL), the first second-direction band (e.g., B71DL), or the second second-direction band (e.g., B12DL). In other words, in this example, discrete match filter device can be used to match all of the filters, e.g., B12DL and B71DL can be matched and B12UL and B71UL can be matched. These filters can be abutted with respect to each other and discretely matched to each other.

In one example, the first amplification and filtering path 502, the second amplification and filtering path 504, the third amplification and filtering path 506 and the fourth amplification and filtering path 508 can each include dedicated radio frequency (RF) amplifiers (gain blocks) or amplifier chains, RF detectors, variable RF attenuators and RF filters for each uplink and downlink band, where the variable RF attenuators can apply a fixed or variable gain. Further, the amplifier chains can include a combination of LNAs and/or PAs.

Figure 6:
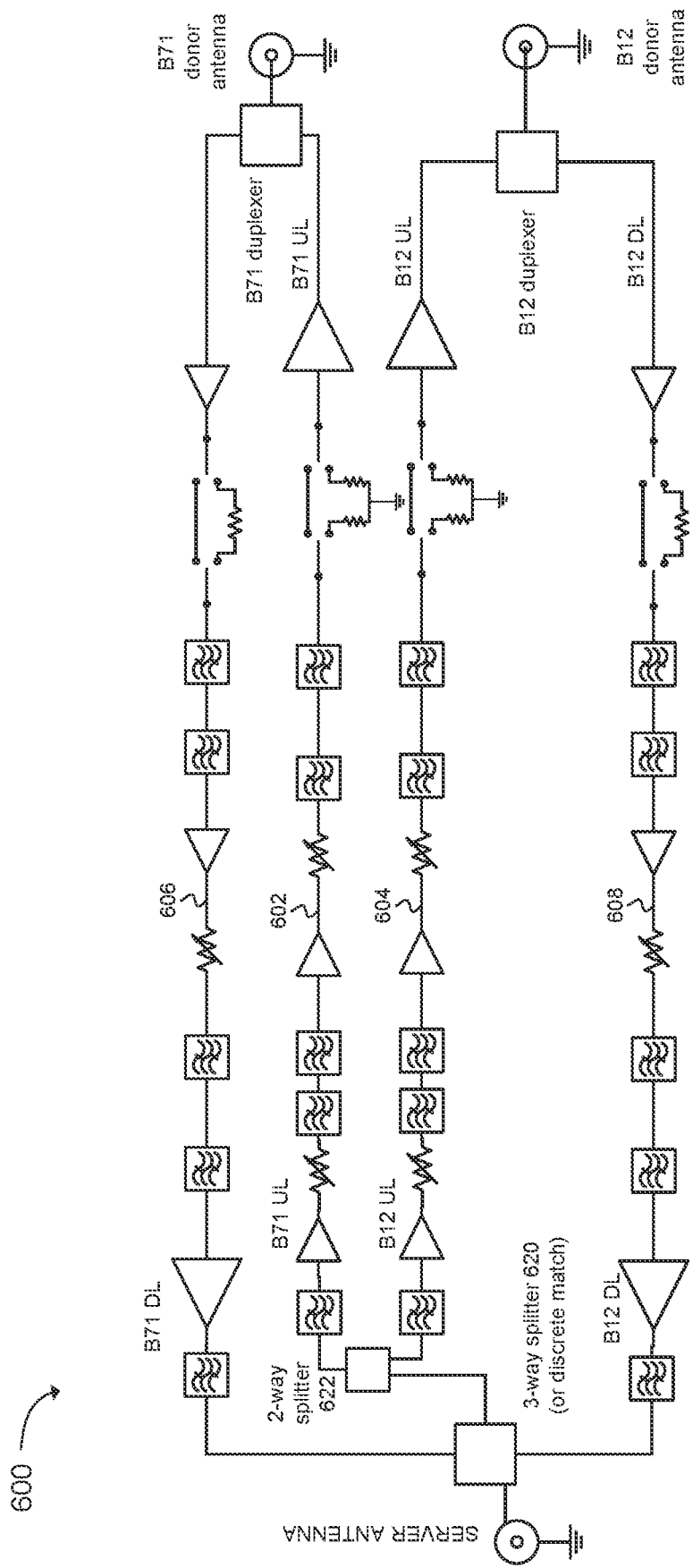
FIG. 6 illustrates a repeater having separate donor antennas and a combined server antenna in accordance with an example.

FIG. 6 illustrates an example of a repeater 600 having separate donor antennas and a combined server antenna. The repeater 600 can include a first amplification and filtering path 602, a second amplification and filtering path 604, a third amplification and filtering path 606 and a fourth amplification and filtering path 608. In this specific example, the first amplification and filtering path 602 can be associated with B71UL, the second amplification and filtering path 604 can be associated with B12UL, the third amplification and filtering path 606 can be associated with B71DL and the fourth amplification and filtering path 608 can be associated with B12DL.

Further, in this example, the repeater 600 can include a signal splitter 620 (e.g., a 3-way splitter) or a discrete match filter device, which can be communicatively coupled to another signal splitter 622 (e.g., a 2-way splitter). Since matching B71UL and B12UL can be difficult, in this example, a discrete match filter device can be directly coupled to the third amplification and filtering path 606 associated with B71DL and the fourth amplification and filtering path 608 associated with B12DL, while the other signal splitter 622 (e.g., the 2-way splitter) can be directly coupled to the first amplification and filtering path 602 associated with B71UL and the second amplification and filtering path 604 associated with B12UL. In other words, in this example, the discrete match filter device is not used for B71UL and B12UL.

Figure 7:
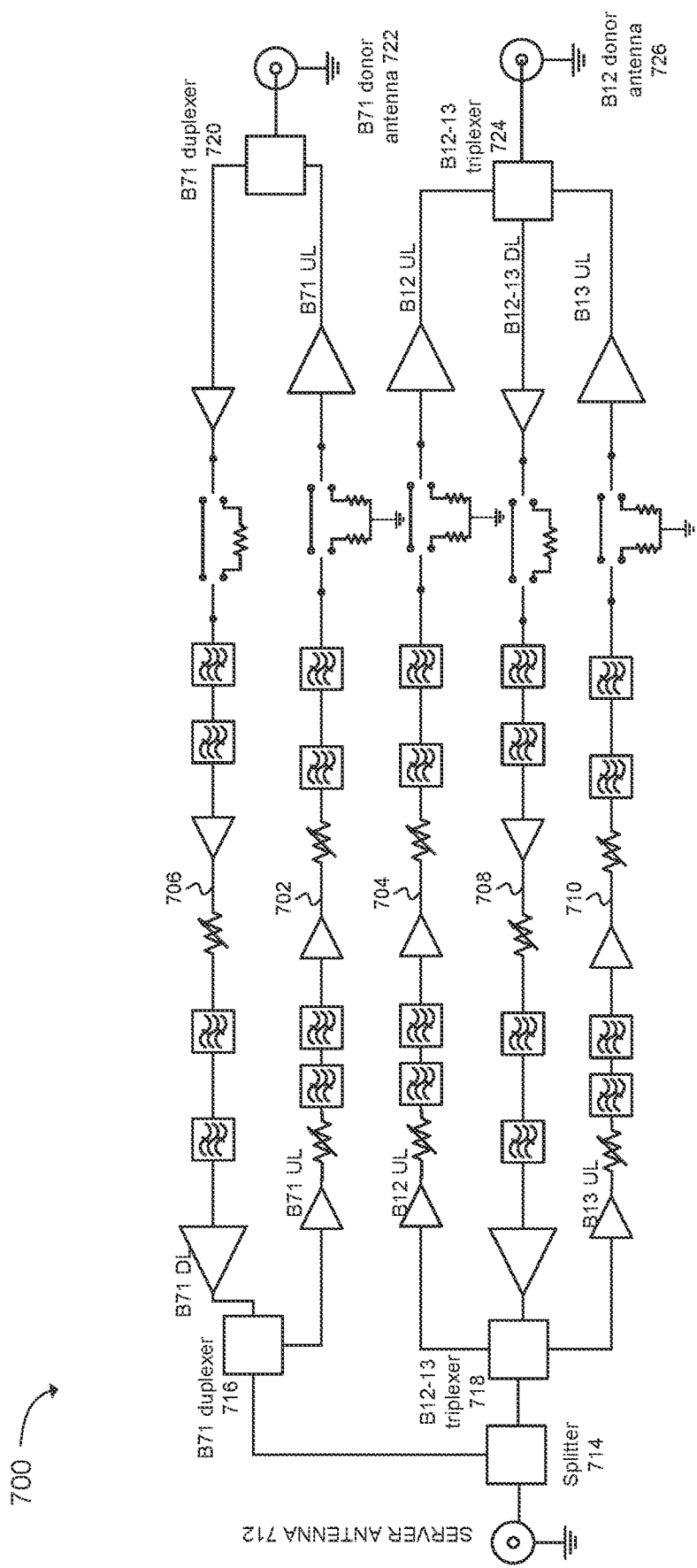
FIG. 7 illustrates a repeater having separate donor antennas and a combined server antenna in accordance with an example.

FIG. 7 illustrates an example of a repeater 700 having separate donor antennas and a combined server antenna. The repeater 700 can include a first amplification and filtering path 702, a second amplification and filtering path 704, a third amplification and filtering path 706, a fourth amplification and filtering path 708, and a fifth amplification and filtering path 710. In this specific example, the first amplification and filtering path 702 can be associated with B71UL, the second amplification and filtering path 704 can be associated with B12UL, the third amplification and filtering path 706 can be associated with B71DL, the fourth amplification and filtering path 708 can be associated with B12-13DL, and the fifth amplification and filtering path 710 can be associated with B13UL.

Further, in this example, the repeater 700 can include a signal splitter 714 communicatively coupled to a server antenna 712. The signal splitter 714 can be communicatively coupled to a first B71 duplexer 716 and a first B12-13 triplexer 718. The repeater 700 can also include a second B71 duplexer 720 communicatively coupled to a B71 donor antenna 722, as well as a second B12-13 triplexer 724 communicatively coupled to a B12 donor antenna 726.

In this example, the first amplification and filtering path 702 can be communicatively coupled between the first B71 duplexer 716 and the second B71 duplexer 720, the second amplification and filtering path 704 can be communicatively coupled between the first B12-13 triplexer 718 and the second B12-13 triplexer 724, the third amplification and filtering path 706 can be communicatively coupled between the first B71 duplexer 716 and the second B71 duplexer 720, the fourth amplification and filtering path 708 can be communicatively coupled between the first B12-13 triplexer 718 and the second B12-13 triplexer 724, and the fifth amplification and filtering path 710 can be communicatively coupled between the first B12-13 triplexer 718 and the second B12-13 triplexer 724.

FIG. 8 illustrates an example of a repeater system 800. The repeater system can include a first repeater 806 and a second repeater 808. The first repeater 806 and the second repeater 808 can be communicatively coupled to a splitter 804. The splitter 804 can be communicatively coupled to a server antenna 802 via a server port 803. In this example, a single server antenna can be used for the multiple repeaters. In addition, the first repeater 806 can be communicatively coupled to a first donor antenna 810 via a first donor port 809, and the second repeater 808 can be communicatively coupled to a second donor antenna 812 via a second donor port 811. The server antenna 802, first donor antenna 810, and second donor antenna 812 can be included with the repeater system 800. Alternatively, one or more of the first donor antenna 810, second donor antenna 812, or server antenna 802 can be sold separately from the repeater system 800. In this example, each repeater (i.e. first repeater and second repeater) can use a separate donor antenna as compared to another repeater in the repeater system 800.

The first repeater 806 is communicatively coupled between the server port 803 and the first donor port 809. The first repeater 806 includes a first amplification and filtering path for a first first-direction signal in a first first-direction band. The second repeater 808 is communicatively coupled between the server port 803 and the second donor port 811. The second repeater includes a second amplification and filtering path for a second first-direction signal in a second first-direction band.

In an alternative example, the splitter 804 can be replaced with a discrete match filter device. In another example, the splitter 804 can refer to a discrete match filter device.

As a non-limiting example, the first repeater 806 and the first donor antenna 810 can be associated with B71, and the second repeater 808 and the second donor antenna 812 can be associated with B12. In addition, the first repeater 806 and the first donor antenna 810 and/or the second repeater 808 and the second donor antenna 812 can be configured to communicate additional bands, such as B2, B4, B5, B13, B25, B41, etc. As previously discussed with respect to FIG. 5, each first direction band can be communicated on a separate first direction amplification and filtering path in one of the first repeater 806 or the second repeater 808. Alternatively, multiple first direction bands can be included on a single first direction amplification and filtering path. Each second direction band can be communicated on a separate second direction amplification and filtering path. Alternatively, multiple second direction bands can be included on a single second direction amplification and filtering path, as shown in FIG. 7 with the B12 and B13 DL signals sent on a single amplification and filtering path 708.

In one example, a third amplification and filtering path for a first second-direction signal can be located in the first repeater 806 and communicatively coupled between the first donor port 809 and the server port 803 for a first second-direction band. A fourth amplification and filtering path can be located in the second repeater 808 for a second second-direction signal that is communicatively coupled between the second donor port 811 and the server port 803 for a second second-direction band. A splitter or the discrete match filter device can be coupled to one or more of: the first amplification and filtering path, the second amplification and filtering path, the third amplification and filtering path or the fourth amplification and filtering path. The discrete match filter device includes one or more bandpass filters corresponding to one or more of the first first-direction band, the second first-direction band, the first second-direction band, or the second second-direction band.

In one example, the first donor port 809 is configured to send the first first-direction signal amplified by the first repeater 806 to a first donor antenna 810 coupled to the first donor port 809. The first donor port 809 can receive the first second-direction signal at the first donor port 809 from the first donor antenna 810 to be filtered and amplified by the first repeater 806. The second donor port 811 is configured to send the second first-direction signal amplified by the second repeater 808 to a second donor antenna 812 coupled to the second donor port 811. The second donor 811 port can receive the second second-direction signal at the second donor port 811 from the second donor antenna 8121 to be filtered and amplified by the second repeater 808.

In another example, the server port 803 illustrated in FIG. 8 is configured to send the first second-direction signal amplified by the first repeater 806 to a server antenna 802 coupled to the server port 803. The server port 803 can receive the first first-direction signal at the server port 803 from the server antenna 802 to be filtered and amplified by the first repeater 806. The server port 803 can send the second second-direction signal amplified by the second repeater 808 to the server antenna 802 coupled to the server port 803. The server port 803 can receive the second first-direction signal at the server port 803 from the server antenna 802 to be filtered and amplified by the second repeater 808.

In one example, the first first-direction band of the first repeater 806 can be spectrally adjacent to the second first-direction band of the second repeater 808, and a combination of the first first-direction band and the second first-direction band can have a fractional bandwidth that is greater than a defined fractional bandwidth threshold ratio for a selected filter type. In one example, the selected filter type can be a surface acoustic wave (SAW) filter. In another example, the first first-direction band and the second first-direction band can have a spectral gap that is less than a threshold, where the spectral gap can be a frequency gap between the first first-direction band and the second first-direction band. As a non-limiting example, a spectral gap of 1 MHz or 2 MHz may be less than the threshold, thereby making the first first-direction band spectrally adjacent to the second first-direction band.

In one example, the defined fractional bandwidth threshold ratio for the selected filter type (e.g., SAW filter) can be approximately 5%. Further, the combination of the first first-direction band (e.g., B71UL) and the second first-direction band (e.g., B12UL) can have a relative gap that is less than a defined relative gap threshold ratio for the selected filter type. In a specific example, the defined relative gap threshold ratio for the selected filter type can be 1% or 0.75%.

In another example of FIG. 8, the first amplification and filtering path and the second amplification and filtering path are uplink paths. The third amplification and filtering path and the fourth amplification and filtering path are downlink paths. The first first-direction band corresponds to a band 71 (B71) uplink frequency range between 663 MHz and 698 MHz; and the second first-direction band corresponds to a band 12 (B12) uplink frequency range between 699 megahertz (MHz) and 716 MHz.

Figure 9:
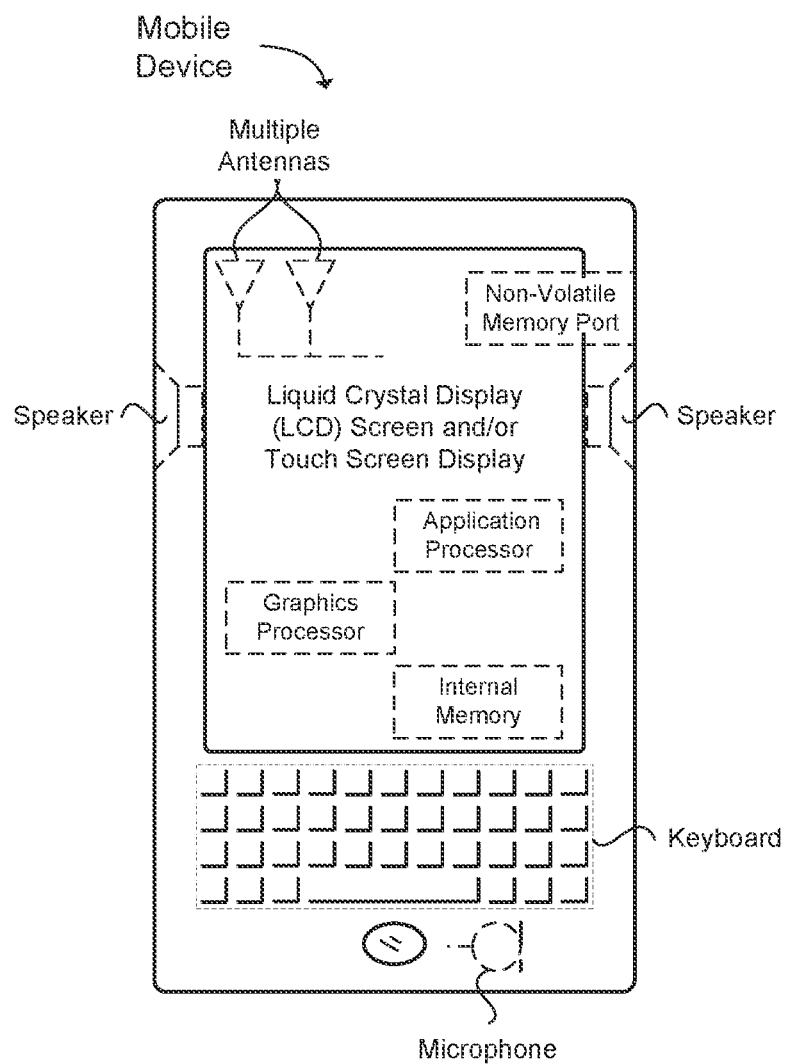
FIG. 9 illustrates a wireless device in accordance with an example.

FIG. 9 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes a repeater, comprising: a server port; a first donor port; a second donor port; a first amplification and filtering path for a first first-direction signal communicatively coupled between the first donor port and the server port for a first first-direction band; a second amplification and filtering path for a second first-direction signal communicatively coupled between the second donor port and the server port for a second first-direction band, wherein the first first-direction signal and the second first-direction signal are uplink signals being directed from the server port to one of the first donor port or the second donor port, wherein the first first-direction band is spectrally adjacent to the second first-direction band, and a combination of the first first-direction band and the second first-direction band has a fractional bandwidth that is greater than a defined fractional bandwidth threshold ratio for a selected filter type.

Example 2 includes the repeater of Example 1, further comprising: a third amplification and filtering path for a first second-direction signal communicatively coupled between the first donor port and the server port for a first second-direction band; and a fourth amplification and filtering path for a second second-direction signal communicatively coupled between the second donor port and the server port for a second second-direction band.

Example 3 includes the repeater of any of Examples 1 to 2, further comprising: a first multiplexer communicatively coupled to the first donor port, the first amplification and filtering path and the third amplification and filtering path; and a second multiplexer communicatively coupled to the second donor port, the second amplification and filtering path and the fourth amplification and filtering path.

Example 4 includes the repeater of any of Examples 1 to 3, wherein the first donor port is configured to: send the first first-direction signal amplified by the repeater to a first donor antenna coupled to the first donor port; and receive the first second-direction signal at the first donor port from the first donor antenna.

Example 5 includes the repeater of any of Examples 1 to 4, wherein the second donor port is configured to: send the second first-direction signal amplified by the repeater to a second donor antenna coupled to the second donor port; and receive the second second-direction signal at the second donor port from the second donor antenna.

Example 6 includes the repeater of any of Examples 1 to 5, further comprising a signal splitter communicatively coupled between the first donor port, the second donor port and the server port, wherein the signal splitter is coupled to the first amplification and filtering path and the second amplification and filtering path.

Example 7 includes the repeater of any of Examples 1 to 6, wherein the server port is configured to: send the first second-direction signal amplified by the repeater to a server antenna coupled to the server port; and receive the first first-direction signal at the server port from the server antenna; send the second second-direction signal amplified by the repeater to the server antenna coupled to the server port; and receive the second first-direction signal at the server port from the server antenna.

Example 8 includes the repeater of any of Examples 1 to 7, further comprising a discrete match filter device communicatively coupled between the first donor port, the second donor port and the server port, wherein the discrete match filter device is coupled to one or more of: the first amplification and filtering path, the second amplification and filtering path, the third amplification and filtering path and the fourth amplification and filtering path.

Example 9 includes the repeater of any of Examples 1 to 8, wherein the discrete match filter device includes one or more bandpass filters corresponding to one or more of the first first-direction band, the second first-direction band, the first second-direction band, or the second second-direction band.

Example 10 includes the repeater of any of Examples 1 to 9, wherein the defined fractional bandwidth threshold ratio for the selected filter type is 5%.

Example 11 includes the repeater of any of Examples 1 to 10, wherein the combination of the first first-direction band and the second first-direction band has a relative gap that is less than a defined relative gap threshold ratio for the selected filter type, thereby making the first first-direction band spectrally adjacent to the second first-direction band.

Example 12 includes the repeater of any of Examples 1 to 11, wherein the defined relative gap threshold ratio for the selected filter type is 1% or 0.75%.

Example 13 includes the repeater of any of Examples 1 to 12, wherein: the first amplification and filtering path and the second amplification and filtering path are uplink paths; and the third amplification and filtering path and the fourth amplification and filtering path are downlink paths.

Example 14 includes the repeater of any of Examples 1 to 13, wherein: the first first-direction band corresponds to a band 71 (B71) uplink frequency range between 663 MHz and 698 MHz: and the second first-direction band corresponds to a band 12 (B12) uplink frequency range between 699 megahertz (MHz) and 716 MHz.

Example 15 includes the repeater of any of Examples 1 to 14, wherein the selected filter type is a surface acoustic wave (SAW) filter.

Example 16 includes a repeater, comprising: a first port; a second port; a third port; a first amplification and filtering path communicatively coupled between the first port and the second port for a first frequency range; and a second amplification and filtering path communicatively coupled between the first port and the third port for a second frequency range, wherein the first frequency range is spectrally adjacent to the second frequency range in a same signal direction, and a combination of the first frequency range and the second frequency range has a fractional bandwidth that is greater than a defined fractional bandwidth threshold ratio for a selected filter type, or the first frequency range and the second frequency range have a spectral gap that is less than a threshold.

Example 17 includes the repeater of Example 16, wherein a combination of the first frequency range and the second frequency range has a relative gap that is less than a defined relative gap threshold ratio for the selected filter type.

Example 18 includes the repeater of any of Examples 16 to 17, further comprising a signal splitter communicatively coupled between the first port, the second port and the third port, wherein the signal splitter is coupled to the first amplification and filtering path and the second amplification and filtering path.

Example 19 includes the repeater of any of Examples 16 to 18, further comprising a discrete match filter device communicatively coupled between the first port, the second port and the third port, wherein the discrete match filter device is coupled to the first amplification and filtering path and the second amplification and filtering path.

Example 20 includes the repeater of any of Examples 16 to 19, wherein the discrete match filter device includes one or more bandpass filters for one or more frequency ranges in an opposite signal direction of the first frequency range and the second frequency range.

Example 21 includes the repeater of any of Examples 16 to 20, wherein the first amplification and filtering path, the first frequency range, the second amplification and filtering path and the second frequency range are in an uplink, and the same signal direction is an uplink direction.

Example 22 includes the repeater of any of Examples 16 to 21, wherein the first amplification and filtering path, the first frequency range, the second amplification and filtering path and the second frequency range are in a downlink, and the same signal direction is a downlink direction.

Example 23 includes the repeater of any of Examples 16 to 22, wherein: the first frequency range corresponds to a band 71 (B71) uplink frequency range between 663 MHz and 698 MHz; and the second frequency range corresponds to a band 12 (B12) uplink frequency range between 699 megahertz (MHz) and 716 MHz.

Example 24 includes the repeater of any of Examples 16 to 23, wherein: the first port is a server port, the second port is a first donor port, and the third port is a second donor port.

Example 25 includes the repeater of any of Examples 16 to 24, further comprising: a server antenna communicatively coupled to the server port; a first donor antenna communicatively coupled to the first donor port; and a second donor antenna communicatively coupled to the second donor port.

Example 26 includes the repeater of any of Examples 16 to 25, wherein the selected filter type is a surface acoustic wave (SAW) filter.

Example 27 includes a signal booster, comprising: a server port; a first donor port; a second donor port; a splitter communicatively coupled to the server port; a first uplink amplification and filtering path communicatively coupled to the splitter and the first donor port for a first uplink band; and a second uplink second amplification and filtering path communicatively coupled to the splitter and the second donor port for a second uplink band, wherein the first uplink band is spectrally adjacent to the second uplink band, and a combination of the first uplink band and the second uplink band has a fractional bandwidth that is greater than a defined fractional bandwidth threshold ratio for a selected filter type.

Example 28 includes the signal booster of Example 27, wherein a combination of the first uplink band and the second uplink band has a relative gap that is less than a defined relative gap threshold ratio for the selected filter type.

Example 29 includes the signal booster of any of Examples 27 to 28, wherein: the first uplink band corresponds to a band 71 (B71) uplink frequency range between 663 MHz and 698 MHz; and the second uplink band corresponds to a band 12 (B12) uplink frequency range between 699 megahertz (MHz) and 716 MHz.

Example 30 includes the signal booster of any of Examples 27 to 29, wherein the selected filter type is a surface acoustic wave (SAW) filter.

Example 31 includes a repeater system, comprising: a server port; a first donor port; a second donor port; a first repeater communicatively coupled between the server port and the first donor port, wherein the first repeater includes a first amplification and filtering path for a first first-direction signal in a first first-direction band; a second repeater communicatively coupled between the server port and the second donor port, wherein the second repeater includes a second amplification and filtering path for a second first-direction signal in a second first-direction band, wherein the first first-direction band is spectrally adjacent to the second first-direction band, and a combination of the first first-direction band and the second first-direction band has a fractional bandwidth that is greater than a defined fractional bandwidth threshold ratio for a selected filter type.

Example 32 includes the repeater system of Example 31, further comprising a splitter communicatively coupled between the server port and the first repeater and the second repeater.

Example 33 includes the repeater system of any of Examples 31 to 32, further comprising a discrete match filter device communicatively coupled between the server port and the first repeater and the second repeater.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater system, comprising:
   a server port;
   a first donor port;
   a second donor port;
   a first repeater communicatively coupled between the server port and the first donor port, wherein the first repeater includes a first amplification and filtering path for a first first-direction signal in a first first-direction band;
   a second repeater communicatively coupled between the server port and the second donor port, wherein the second repeater includes a second amplification and filtering path for a second first-direction signal in a second first-direction band,
   wherein the first first-direction band is spectrally adjacent to the second first-direction band, and a combination of the first first-direction band and the second first-direction band has a fractional bandwidth that is greater than a defined fractional bandwidth threshold ratio for a selected filter type.

2. The repeater system of claim 1, further comprising a signal splitter communicatively coupled between the server port and the first repeater and the second repeater.

3. The repeater system of claim 1, further comprising a discrete match filter device communicatively coupled between the server port and the first repeater and the second repeater.

4. The repeater system of claim 1, further comprising:
   a third amplification and filtering path for a first second-direction signal communicatively coupled between the first donor port and the server port for a first second-direction band; and
   a fourth amplification and filtering path for a second second-direction signal communicatively coupled between the second donor port and the server port for a second second-direction band.

5. The repeater system of claim 4, further comprising:
   a first multiplexer communicatively coupled to the first donor port, the first amplification and filtering path and the third amplification and filtering path; and
   a second multiplexer communicatively coupled to the second donor port, the second amplification and filtering path and the fourth amplification and filtering path.

6. The repeater system of claim 4, wherein the first donor port is configured to:
   send the first first-direction signal amplified by the first repeater to a first donor antenna coupled to the first donor port; and
   receive the first second-direction signal at the first donor port from the first donor antenna to be filtered and amplified by the first repeater.

7. The repeater system of claim 4, wherein the second donor port is configured to:
   send the second first-direction signal amplified by the second repeater to a second donor antenna coupled to the second donor port; and
   receive the second second-direction signal at the second donor port from the second donor antenna to be filtered and amplified by the second repeater.

8. The repeater system of claim 4, wherein the server port is configured to:
   send the first second-direction signal amplified by the first repeater to a server antenna coupled to the server port; and
   receive the first first-direction signal at the server port from the server antenna to be filtered and amplified by the first repeater;
   send the second second-direction signal amplified by the second repeater to the server antenna coupled to the server port; and
   receive the second first-direction signal at the server port from the server antenna to be filtered and amplified by the second repeater.

9. The repeater system of claim 4, further comprising a discrete match filter device communicatively coupled between the first donor port, the second donor port and the server port, wherein the discrete match filter device is coupled to one or more of: the first amplification and filtering path, the second amplification and filtering path, the third amplification and filtering path or the fourth amplification and filtering path.

10. The repeater system of claim 9, wherein the discrete match filter device includes one or more bandpass filters corresponding to one or more of the first first-direction band, the second first-direction band, the first second-direction band, or the second second-direction band.

11. The repeater system of claim 1, wherein the defined fractional bandwidth threshold ratio for the selected filter type is 5%.

12. The repeater system of claim 1, wherein the combination of the first first-direction band and the second first-direction band has a relative gap that is less than a defined relative gap threshold ratio for the selected filter type, thereby making the first first-direction band spectrally adjacent to the second first-direction band.

13. The repeater system of claim 12, wherein the defined relative gap threshold ratio for the selected filter type is 1% or 0.75%.

14. The repeater system of claim 4, wherein:
   the first amplification and filtering path and the second amplification and filtering path are uplink paths; and
   the third amplification and filtering path and the fourth amplification and filtering path are downlink paths.

15. The repeater system of claim 1, wherein:
   the first first-direction band corresponds to a band 71 (B71) uplink frequency range between 663 MHz and 698 MHz; and
   the second first-direction band corresponds to a band 12 (B12) uplink frequency range between 699 megahertz (MHz) and 716 MHz.

16. The repeater system of claim 1, wherein the selected filter type is a surface acoustic wave (SAW) filter.

17. A repeater, comprising:
   a server port;
   a first donor port;
   a second donor port;
   a first amplification and filtering path for a first first-direction signal communicatively coupled between the first donor port and the server port for a first first-direction band;
   a second amplification and filtering path for a second first-direction signal communicatively coupled between the second donor port and the server port for a second first-direction band,
   wherein the first first-direction signal and the second first-direction signal are uplink signals being directed from the server port to one of the first donor port or the second donor port;

wherein the first first-direction band is spectrally adjacent to the second first-direction band, and a combination of the first first-direction band and the second first-direction band has a fractional bandwidth that is greater than a defined fractional bandwidth threshold ratio for a selected filter type.

18. The repeater of claim 17, further comprising:
a third amplification and filtering path for a first second-direction signal communicatively coupled between the first donor port and the server port for a first second-direction band; and
a fourth amplification and filtering path for a second second-direction signal communicatively coupled between the second donor port and the server port for a second second-direction band.

19. The repeater of claim 18, further comprising:
a first multiplexer communicatively coupled to the first donor port, the first amplification and filtering path and the third amplification and filtering path; and
a second multiplexer communicatively coupled to the second donor port, the second amplification and filtering path and the fourth amplification and filtering path.

20. The repeater of claim 18, wherein the first donor port is configured to:
send the first first-direction signal amplified by the repeater to a first donor antenna coupled to the first donor port; and
receive the first second-direction signal at the first donor port from the first donor antenna.

21. The repeater of claim 18, wherein the second donor port is configured to:
send the second first-direction signal amplified by the repeater to a second donor antenna coupled to the second donor port; and
receive the second second-direction signal at the second donor port from the second donor antenna.

22. The repeater of claim 18, further comprising a signal splitter communicatively coupled between the first donor port, the second donor port and the server port, wherein the signal splitter is coupled to the first amplification and filtering path and the second amplification and filtering path.

23. The repeater of claim 22, wherein the server port is configured to:
send the first second-direction signal amplified by the repeater to a server antenna coupled to the server port; and
receive the first first-direction signal at the server port from the server antenna;
send the second second-direction signal amplified by the repeater to the server antenna coupled to the server port; and
receive the second first-direction signal at the server port from the server antenna.

24. The repeater of claim 18, further comprising a discrete match filter device communicatively coupled between the first donor port, the second donor port and the server port, wherein the discrete match filter device is coupled to one or more of: the first amplification and filtering path, the second amplification and filtering path, the third amplification and filtering path and the fourth amplification and filtering path.

25. The repeater of claim 24, wherein the discrete match filter device includes one or more bandpass filters corresponding to one or more of the first first-direction band, the second first-direction band, the first second-direction band, or the second second-direction band.

26. The repeater of claim 17, wherein the defined fractional bandwidth threshold ratio for the selected filter type is 5%.

27. The repeater of claim 17, wherein the combination of the first first-direction band and the second first-direction band has a relative gap that is less than a defined relative gap threshold ratio for the selected filter type, thereby making the first first-direction band spectrally adjacent to the second first-direction band.

28. The repeater of claim 27, wherein the defined relative gap threshold ratio for the selected filter type is 1% or 0.75%.

29. The repeater of claim 18, wherein:
the first amplification and filtering path and the second amplification and filtering path are uplink paths; and
the third amplification and filtering path and the fourth amplification and filtering path are downlink paths.

30. The repeater of claim 17, wherein:
the first first-direction band corresponds to a band 71 (B71) uplink frequency range between 663 MHz and 698 MHz; and
the second first-direction band corresponds to a band 12 (B12) uplink frequency range between 699 megahertz (MHz) and 716 MHz.

31. The repeater of claim 17, wherein the selected filter type is a surface acoustic wave (SAW) filter.

32. The repeater of claim 1, wherein the repeater further comprises:
a first repeater communicatively coupled between the server port and the first donor port, wherein the first repeater includes the first amplification and filtering path for the first first-direction signal in the first first-direction band; and
a second repeater communicatively coupled between the server port and the second donor port, wherein the second repeater includes the second amplification and filtering path for the second first-direction signal in the second first-direction band.

33. The repeater of claim 32, wherein the first repeater further comprises:
a third amplification and filtering path for the first second-direction signal communicatively coupled between the first donor port and the server port for a first second-direction band; and
the second repeater further comprises a fourth amplification and filtering path for the second second-direction signal communicatively coupled between the second donor port and the server port for a second second-direction band.

34. A repeater, comprising:
a first port;
a second port;
a third port;
a first amplification and filtering path communicatively coupled between the first port and the second port for a first frequency range; and
a second amplification and filtering path communicatively coupled between the first port and the third port for a second frequency range,
wherein the first frequency range is spectrally adjacent to the second frequency range in a same signal direction, and a combination of the first frequency range and the second frequency range has a fractional bandwidth that is greater than a defined fractional bandwidth threshold ratio for a selected filter type, or the first frequency range and the second frequency range have a spectral gap that is less than a threshold.

35. The repeater of claim 34, wherein a combination of the first frequency range and the second frequency range has a relative gap that is less than a defined relative gap threshold ratio for the selected filter type.

36. The repeater of claim 34, further comprising a signal splitter communicatively coupled between the first port, the second port and the third port, wherein the signal splitter is coupled to the first amplification and filtering path and the second amplification and filtering path.

37. The repeater of claim 34, further comprising a discrete match filter device communicatively coupled between the first port, the second port and the third port, wherein the discrete match filter device is coupled to the first amplification and filtering path and the second amplification and filtering path.

38. The repeater of claim 37, wherein the discrete match filter device includes one or more bandpass filters for one or more frequency ranges in an opposite signal direction of the first frequency range and the second frequency range.

39. The repeater of claim 34, wherein the first amplification and filtering path, the first frequency range, the second amplification and filtering path and the second frequency range are in an uplink, and the same signal direction is an uplink direction.

40. The repeater of claim 34, wherein the first amplification and filtering path, the first frequency range, the second amplification and filtering path and the second frequency range are in a downlink, and the same signal direction is a downlink direction.

41. The repeater of claim 34, wherein:
the first frequency range corresponds to a band 71 (B71) uplink frequency range between 663 MHz and 698 MHz; and
the second frequency range corresponds to a band 12 (B12) uplink frequency range between 699 megahertz (MHz) and 716 MHz.

42. The repeater of claim 34, wherein: the first port is a server port, the second port is a first donor port, and the third port is a second donor port.

43. The repeater of claim 42, further comprising:
a server antenna communicatively coupled to the server port;
a first donor antenna communicatively coupled to the first donor port; and
a second donor antenna communicatively coupled to the second donor port.

44. The repeater of claim 34, wherein the selected filter type is a surface acoustic wave (SAW) filter.

45. A signal booster, comprising:
a server port;
a first donor port;
a second donor port;
a splitter communicatively coupled to the server port;
a first uplink amplification and filtering path communicatively coupled to the splitter and the first donor port for a first uplink band; and
a second uplink second amplification and filtering path communicatively coupled to the splitter and the second donor port for a second uplink band,
wherein the first uplink band is spectrally adjacent to the second uplink band, and a combination of the first uplink band and the second uplink band has a fractional bandwidth that is greater than a defined fractional bandwidth threshold ratio for a selected filter type.

46. The signal booster of claim 45, wherein a combination of the first uplink band and the second uplink band has a relative gap that is less than a defined relative gap threshold ratio for the selected filter type.

47. The signal booster of claim 45, wherein:
the first uplink band corresponds to a band 71 (B71) uplink frequency range between 663 MHz and 698 MHz; and
the second uplink band corresponds to a band 12 (B12) uplink frequency range between 699 megahertz (MHz) and 716 MHz.

48. The signal booster of claim 45, wherein the selected filter type is a surface acoustic wave (SAW) filter.

* * * * *